(12) United States Patent
Yun

(10) Patent No.: US 6,244,388 B1
(45) Date of Patent: Jun. 12, 2001

(54) LUBE APPLICATOR FOR DIE CAST MACHINE PLUNGER

(75) Inventor: Sung Yol Yun, Downey, CA (US)

(73) Assignee: Sunny Die Casting, Inc., Paramount, CA (US)

( * ) Notice: Subject to any disclaimer, the term of this patent is extended or adjusted under 35 U.S.C. 154(b) by 0 days.

(21) Appl. No.: 09/348,770

(22) Filed: Jul. 7, 1999

(51) Int. Cl.[7] .................. F16N 25/04; B65G 33/00; B22C 3/00; B22D 17/04
(52) U.S. Cl. ............... 184/63; 198/671; 164/72; 164/312
(58) Field of Search .................. 184/61, 63; 198/671; 164/312, 72, 267

(56) References Cited

U.S. PATENT DOCUMENTS

| | | | |
|---|---|---|---|
| 3,232,419 | * | 2/1966 | Rasmussen ..................... 198/671 X |
| 3,255,898 | * | 6/1966 | Carli et al. ..................... 198/671 X |
| 3,602,552 | * | 8/1971 | Morgan ........................... 198/672 X |
| 3,903,838 | * | 9/1975 | Bennett et al. ...................... 118/308 |
| 4,431,105 | * | 2/1984 | Meeker et al. .................. 198/671 X |
| 4,881,862 | * | 11/1989 | Dick ................................ 198/671 X |
| 5,014,765 | * | 5/1991 | Aoyama et al. ....................... 164/72 |
| 5,388,631 | * | 2/1995 | Suganuma et al. .................... 164/72 |
| 5,819,839 | * | 10/1998 | Mihelich et al. ................... 164/312 |
| 5,983,978 | * | 11/1999 | Vining et al. ..................... 164/312 |

* cited by examiner

Primary Examiner—Charles A. Marmor
Assistant Examiner—Roger Pang
(74) Attorney, Agent, or Firm—Pillsbury Winthrop LLP

(57) ABSTRACT

The present invention discloses an improved dry graphite lube applicator for die cast machines. The lube applicator comprises a hopper holding dry graphite lube, a feeding chamber in gravity communication with the hopper, a feeding turn screw disposed within the feeding chamber having a plurality of spiraling turns wherein each turn holds a predetermined amount of dry graphite, a motor connected to the feeding turn screw to rotate the feeding turn screw, a dispensing chamber in communication with the feeding chamber wherein the feeding screw deposits the predetermined amount of dry graphite, an air compressor source in pressure communication with the dispensing chamber to deliver the predetermined amount of dry graphite to an injection sleeve of the die cast machine. In further embodiments of the present invention, an additional sweeper mechanism is included.

17 Claims, 4 Drawing Sheets

LUBE APPLICATOR FOR DIE CAST MACHINE PLUNGER

BACKGROUND OF THE INVENTION

1. Field of the Invention

This present invention relates to mechanized lube applicators. More specifically, embodiments of the present invention are directed to a lube applicator for applying lubrication to the plungers of die cast machines.

2. Related Art

Die casting is generally performed by the use of casting molds attached to two separate plates, a stationary plate and a movable plate. The molds are "cast" by bringing the movable plate against the stationary plate ("closed position") so that the casting molds can act as a template for the desired casting. While the casting molds are in the closed position, melted material is injected into the casting mold through an injection sleeve by means of a plunger in fluid communication with the casting mold on the stationary plate. Once the fluid cools into a solid, the movable plate separates from the stationary plate to release the finished casting. This aspect of die casting is well known.

However, a constant problem experienced during die casting has been the wear and tear of the plunger during the die cast process. Early efforts to reduce wear and tear on the plunger was the use of grease within the plunger to reduce the friction experienced by the plunger as the plunger moved along the injection sleeve. However, grease caused numerous problems. Besides the messiness involved with the use of grease, grease was difficult to apply and was not uniformly effective throughout the entire injection sleeve. In addition, grease tended to adversely mix with the liquid casting material as the casting material passed through the injection sleeve.

In the past three or four years, the use of dry graphite lubricant for the die cast plunger has gained popular acceptance. However, existing applicators for dry graphite have failed to work effectively for extended periods of time. A constant problem has been the hardening of the dry graphite at the opening of dry graphite container, otherwise known as the hopper. Since the dry graphite is constantly exposed to air in the prior art devices, the natural moisture found in the air mixes with the dry graphite to clog the hopper. Given that prior art devices relied on gravity to pass the dry graphite to the dispensing sleeve of the lube applicator, the lube applicator would fail to dispense dry graphite, or constantly dispense uneven amounts of dry graphite on each trial. Therefore, the lube applicator would constantly have to be disassembled and cleaned after only a few uses for the lube applicator to work effectively. The cleaning process would greatly slow down the die casting process resulting in loss of time and labor costs. Alternative devices attempted to use a vacuum feed within the dispensing sleeve to prevent the clogging problem, but the vacuum feeders have also failed to provide satisfactory results. The additional intakes and outlets in vacuum feeders created clogging problems at additional locations.

An additional problem with vacuum feeders, as well as the push piston feeders, was that the amount of dry graphite used on each trial was not exact. There was no measuring means to ensure that either too little graphite or too much graphite was not used. Instead, whatever amount that fell by gravity into the dispensing sleeve of lube applicator was either vacuumed or pushed by the push piston into the injection sleeve.

Another problem with existing applicators has also been the fact that there is no mechanism to self-clean the inside of the injection sleeve. There are often instances where the dry graphite will collect in the injection sleeve causing too much dry graphite to accumulate near the opening where the liquid die cast material is released into the injection sleeve. However, prior applicators had no mechanism to remedy this problem. The only means was to manually clean the inside of the injection sleeve with a clean rag, but again this process would entail stopping the entire process to clean the injection sleeve.

SUMMARY OF THE DISCLOSURE

It is an object of an embodiment of the present invention to provide an improved lube applicator for die cast machines, which obviates for practical purposes, the above mentioned limitations.

According to an embodiment of the present invention, a lube applicator has a feeding screw to minimize direct exposure of the dry graphite to air, and to accurately measure the amount of dry graphite used in each trial of the die casting process. In addition, a sweeper means is installed which allows the lube applicator to self-clean the inside of the injection sleeve.

In preferred embodiments of the present invention, a dry graphite lube applicator for a die cast machine comprises a hopper holding dry graphite lube, a feeding chamber in gravity communication with the hopper, a feeding turn screw disposed within the feeding chamber having a plurality of spiraling turns wherein each turn holds a predetermined amount of dry graphite, a motor connected to the feeding turn screw to rotate the feeding turn screw, a dispensing chamber in communication with the feeding chamber wherein the feeding screw deposits the predetermined amount of dry graphite, an air compressor source in pressure communication with the dispensing chamber to deliver the predetermined amount of dry graphite to an injection sleeve of the die cast machine. In further embodiments of the present invention, an additional sweeper mechanism is included.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION OF THE PREFERRED EMBODIMENTS

Figure 1:
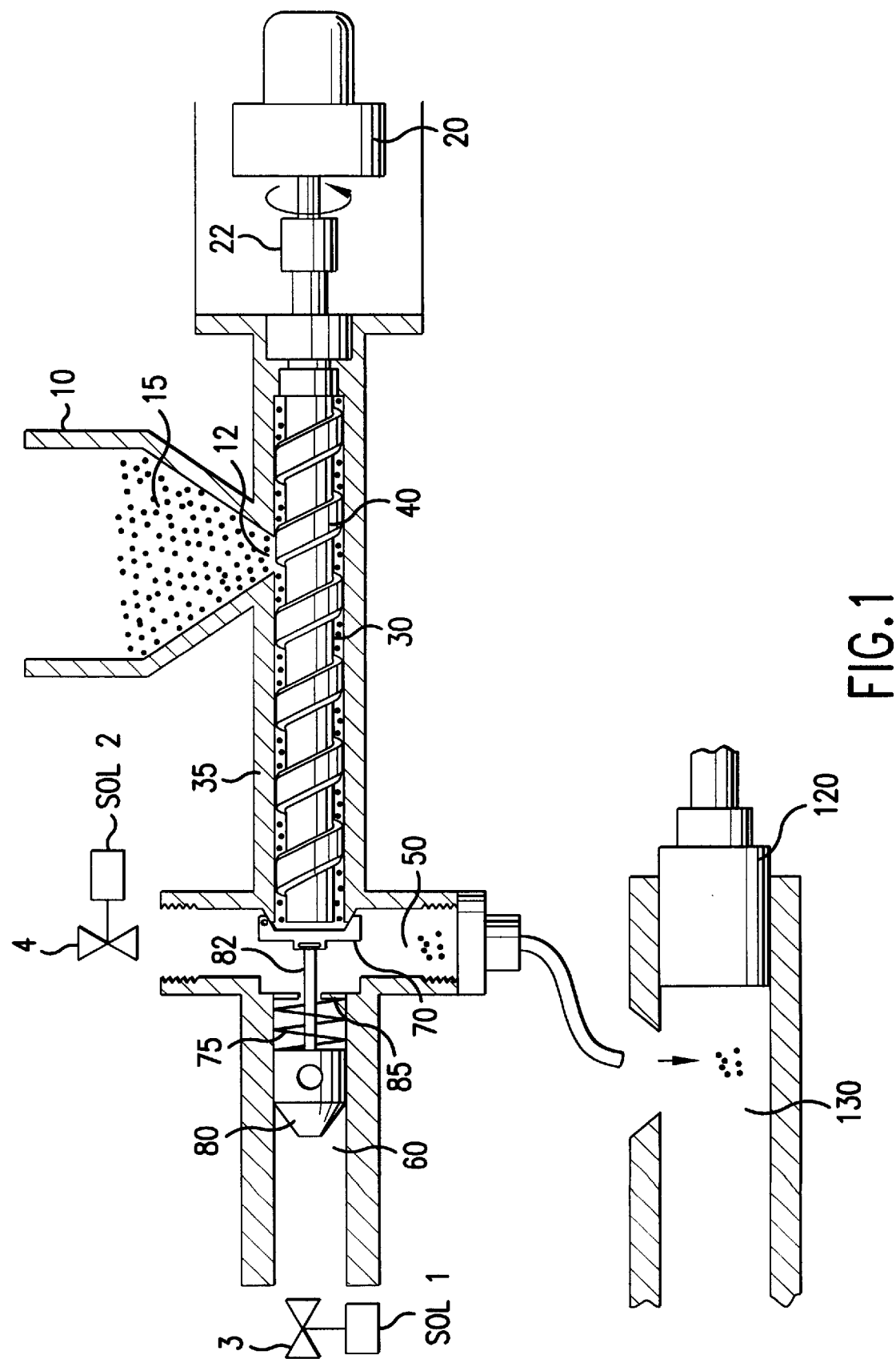
FIG. 1 is a cross-sectional view of the preferred embodiment of the lube applicator.

A detailed description of the present invention will be explained with respect to the drawings. In FIG. 1, a dry graphite lube applicator in accordance with a preferred embodiment of the present invention is seen. Similar to prior art applicators, the lube applicator has a hopper 10 which stores a refillable supply of dry graphite 15. The dry graphite 15 is then gravity fed into a feeding chamber 35. However, unlike prior art applicators having a push piston or a vacuum feed, the present invention uses a feeding turn screw 30 having a plurality of spiraling turns 40 to move the dry graphite into a dispensing chamber 50. This is done by a electric gear motor 20, which is connected to one end of the feeding turn screw 30, which rotates the feeding turn screw 30 counterclockwise pushing the dry graphite 15 along the feeding turn screw 30 towards to dispensing chamber 50. As will be explained below, there are distinct advantages of a feeding turn screw 30 over prior art mechanisms.

One of the key advantages of the feeding turn screw 30 is the ability to minimize direct air contact with the dry graphite 15 in the hopper 10, especially near the opening 12 of the hopper 10 into the feeding chamber 35. The use of a plurality of spiraling turns 40 adapted to closely fit within the walls of the feeding chamber 35 in combination with the dry graphite caught between the spiraling turns 40 act as a buffer for the air to travel to the hopper. As a result, unlike prior art applicators, the dry graphite in combination with the natural moisture in the air does not clog the opening 12 of the hopper 10. Even after numerous trials, the present invention has yet to clog and stop functioning as in prior art devices.

Another advantage of the feeding turn screw 30 is the ability to accurately estimate the amount of dry graphite 15 to be used on each trial of the die cast machine. The use of spiraling turns 40 limits the amount of dry graphite 15 which will be feed in the feeding chamber 35. Thus, each turn of the spiraling turn 40 holds a predetermined amount of dry graphite 15 between the wall of the feeding chamber 35 and the feeding turn screw 30. In the preferred embodiment, the size of the feeding chamber 35 is approximately 127 mm long and 12.5 mm high. The length of one turn 40 is approximately 12 mm with the thickness of 3.8 mm. The distance between the feeding turn screw 30 and the wall of feeding chamber 35 is approximately 2.5 mm. As explained in more detail below, each turn of the feeding turn screw 30 will deposit a predetermined amount of dry graphite 15 into the dispensing chamber 50. The dry graphite 15 is then "blown" by an air compress source 300 into the injection sleeve 130 of the die cast machine.

Additionally, in preferred embodiments of the present invention as seen in FIG. 1, a sweeper mechanism is also included within the lube applicator. The sweeper mechanism is comprised of plunger 80 and plunger rod 82 extending from one side of the plunger 80 with a cap 70 connected to the end of the plunger rod 82. The plunger 80 is housed inside a sweeper chamber 60, which is located opposite of the feeding chamber 35, where the dispensing chamber 50 located in between the feeding chamber 35 and the sweeper chamber 60. On the other side of the plunger 80 is a sweeper valve 3 which controls whether compressed air from compressed air source 300 is released into the sweeper chamber 60 towards the plunger 80. When the sweeper valve 3 is opened, compressed air is released into the sweeping chamber 60, which then pushes the plunger 80 into a closed position where the cap 70 covers the entrance of the feeding chamber 35. In the preferred embodiment of the invention, there is a small opening in the plunger 80 which allows the compressed air, not only to push plunger 80 towards the feeding chamber 35, but also for the compressed air to travel through the plunger 80, through the dispensing chamber 50, and to the injection sleeve 130 to "sweep" any loose dry graphite trapped anywhere in the system. When the sweeper valve 3 is closed, a spring 75, located between the plunger 80 and the spring stop 85, pushes the plunger back to an open position where the cap 70 now closes off the sweeper chamber 60 from the rest of the lube applicator. In alternative embodiments, it is possible for the feeding valve 4 connected to compressed air source 300 to be opened to act as either as an additional or alternative sweeper source.

Figure 2:
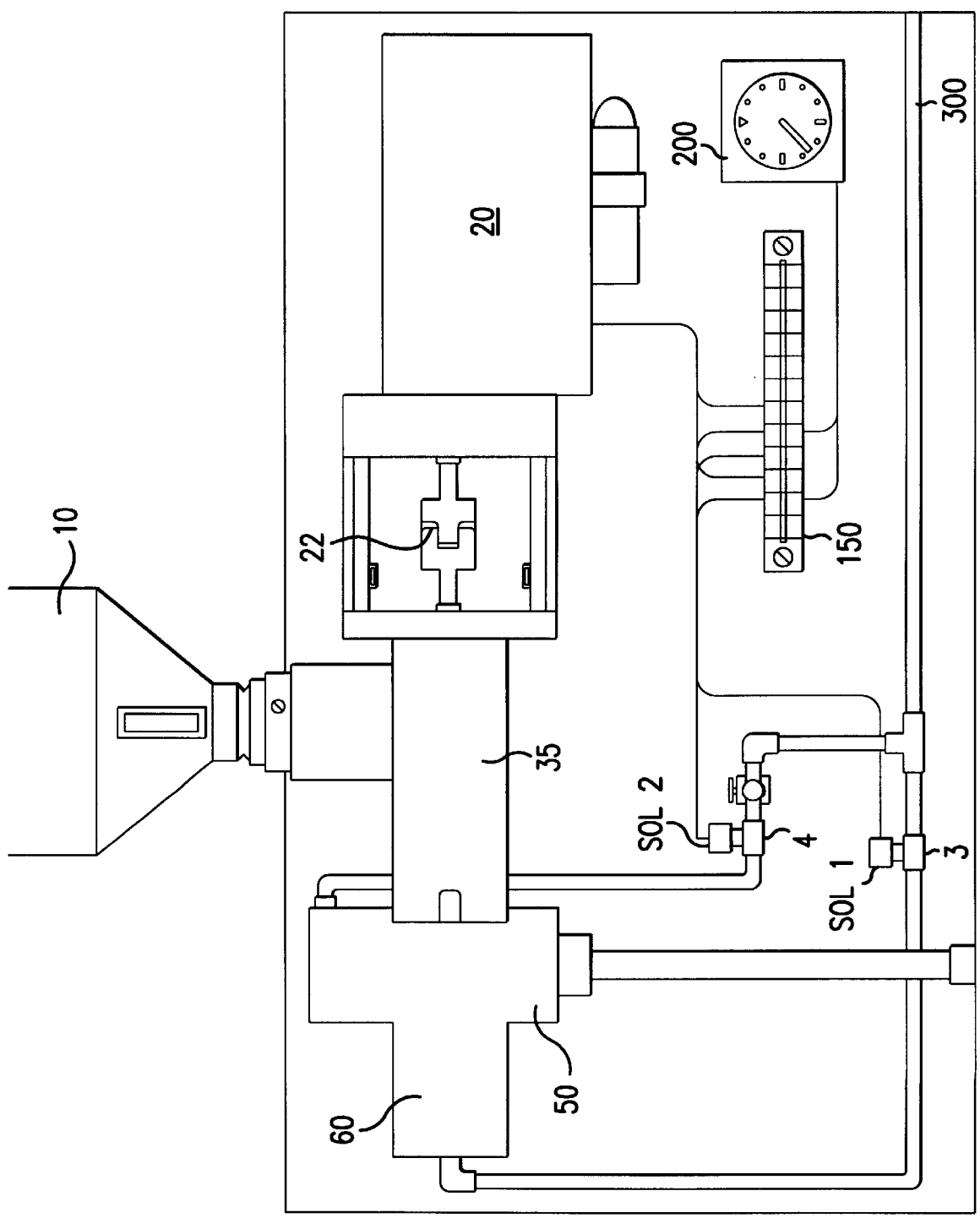
FIG. 2 is a schematic view of the preferred embodiment of the lube applicator.

FIG. 2 describes the control connections of the preferred embodiment of present invention according to FIG. 1. A control circuit 150 is connected to a timer 200. According to the preset values set in timer 200, the control circuit 150 delivers a signal to sweeper solenoid 1 (sol 1) to either open or close the sweeper valve 3 to allow compress air to reach the sweeper chamber 60. Typically, the sweeper valve 3 delivers approximately 80 to 100 psi of compressed air from compressed air source 300 for approximately 3 to 6 seconds according to the value stored in timer 200. The control circuit 150 also delivers a signal to turn on and off electric gear motor 20 according to timer 200. The electric gear motor 20 is connected to the feeding turn screw 30 by gear joint 22 where the motor 20 turns feeding turn screw 30 in a counterclockwise direction. In addition, the control circuit 150 also delivers a signal to feeder solenoid 2 (sol 2) to either open or close feeding valve 4 to allow compress air to reach dispensing chamber 50. Typically, the feeding valve 4 delivers approximately 30 psi of compressed air from compressed air source 300 for approximately 0.5 to 1.5 seconds according to the value stored in timer 200.

Figure 3:
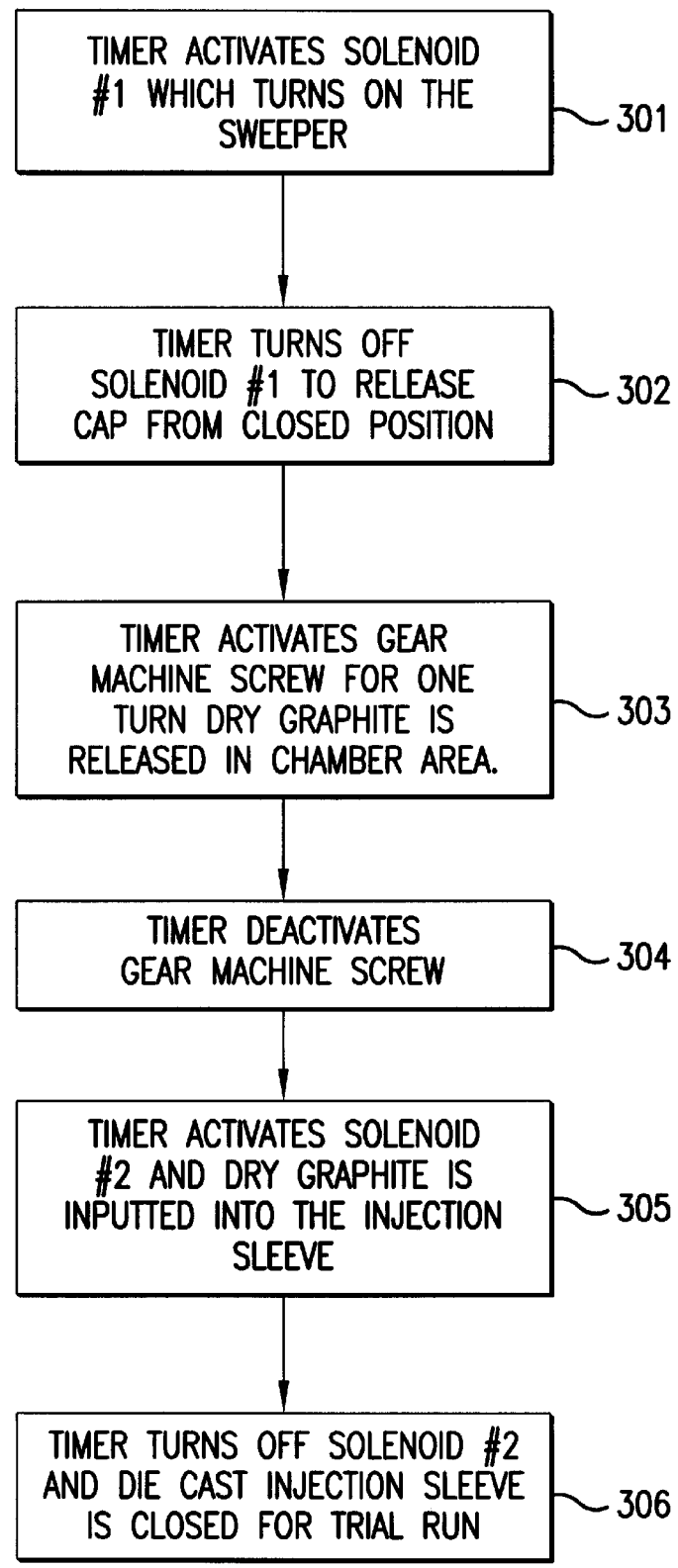
FIG. 3 is a flow chart showing the steps of applying the lube applicator in accordance with the preferred embodiment of the present invention.

FIG. 3 illustrates in flow chart form the basic steps in the function of the preferred embodiment of the present invention. In step 301, the control circuit 150 activates sweeper solenoid 1 (sol 1) to open sweeper valve 3. Once the sweeper valve 3 is open, compressed air from compressed air source 300 pushes plunger 80 to press cap 70 to cover the entrance of feeding chamber 35. In this closed position, the plunger 80 presses spring 75 against spring stop 85. The compressed air then "sweeps" the dispensing chamber 50 through to the injection sleeve 130 clearing the passageways of the lube applicator of any stray dry graphite 15. In step 302, the control circuit 150 deactivates sweeper solenoid 1 (sol 1), which closes sweeper valve 3 and shutting off the compressed air from reaching sweeper chamber 60. The removal of the compressed air from the sweeper chamber 60 allows spring 75 to push plunger 80 back to the open position, removing the cap 70 from the feeding chamber 35 and then closing the entrance of the sweeper chamber 60.

Step 303 follows the sweeper steps. Control circuit 150 activates the motor 20 to turn the feeding turn screw 30 for one turn, releasing dry graphite 15 into dispensing chamber 50. In addition, as the feeding turn screw 30 is turned, additional dry graphite 15 from the hopper 10 is gravity feed into feeding chamber 35 as additional room opens up in the feeding chamber between spiraling turns 40. In step 304, according to timer 200, control circuit 150 turns off the motor 20. In step 305, control circuit 150 activates feeder solenoid 2 (sol 2) to open feeding valve 4. Once the feeding valve 4 is open, compressed air from compressed air source 300 injects the dry graphite 15 in dispensing chamber 50 (dispensed by the feeding turn screw 30) into injection sleeve 130. Inside the injection sleeve 130, the dry graphite 15 can acts as lubricant for plunger piston tip 120. In step 306, according to timer 200, control circuit 150 deactivates feeder solenoid 2 (sol 2), which closes feeder valve 4 and shutting off the compressed air from reaching dispensing chamber 50.

Figure 4:
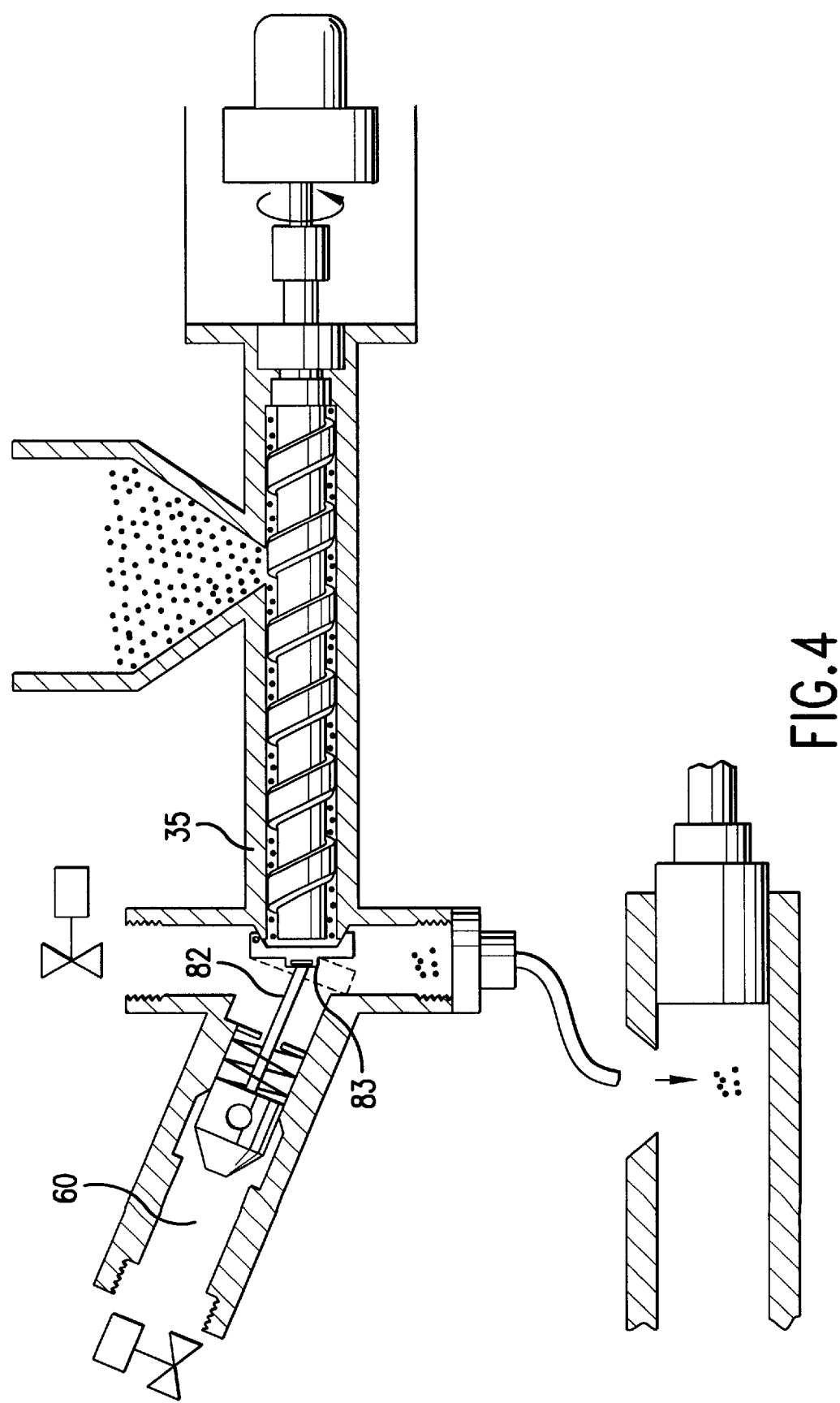
FIG. 4 is a cross-sectional view of an alternative embodiment of the lube applicator.

While the description above refers to particular embodiments of the present invention, it should be understood that many modifications may be made without departing from the spirit thereof. For example, as seen in FIG. 4, the sweeper chamber 60 can be located in a diagonal relationship with respect to the feeding chamber 35. In this cap 70 is connected to plunger rod 82 by a hinge 83 to allow the cap 70 to cover the feeding chamber 35 in the closed position and still cover the sweeper chamber 60 in the open position. In addition, plunger 80 can be moved in the open and closed position by a push piston rather than by the compressed air source. In this case, feeding valve 4 can act as the sweeper. Thus, the accompanying claims are intended to cover these and other modifications as would fall within the true scope and spirit of the present invention.

The presently disclosed embodiments are therefore to be considered in all respects as illustrative and not restrictive. The scope of the invention is therefore indicated by the appended claims, rather than the foregoing description, and all changes which come within the meaning and range of equivalency of the claims are therefore intended to be embraced therein.

What is claimed is:

1. A dry graphite lube applicator for a die cast machine having an injection sleeve, the dry graphite lube applicator comprising:
   a hopper holding dry graphite lube;
   a feeding chamber in gravity communication with the hopper;
   a feeding turn screw disposed within the feeding chamber having a plurality of spiraling turns disposed around the circumference of the turn screw, wherein each turn holds a predetermined amount of dry graphite lube;
   a driving device connected to the feeding turn screw to rotate the feeding turn screw within the feeding chamber;
   a controlling device coupled to the driving device to control extent of the turning of the turn screw to accurately estimate an amount of dry graphite lube to be deposited based on the number of turns of the turn screw and the speed of the turns;
   a dispensing chamber in communication with the feeding chamber, wherein the feeding screw deposits the accurately estimated amount of dry graphite lube;
   an air compressor source in pressure communication with the dispensing chamber to deliver the accurately estimated amount of dry graphite lube to the injection sleeve of the die cast machine.

2. The dry graphite lube applicator according to claim 1, wherein the plurality of spiraling turns of the feeding turn screw is in a tight rotatable relationship with the feeding chamber.

3. The dry graphite lube applicator according to claim 1, further comprising a sweeper mechanism which comprises:
   a sweeper chamber in communication with the dispensing chamber;
   a plunger slidably engaged within the sweeper chamber having an open and closed position; and
   a cap means attached to one end of the plunger, wherein the cap means closes off the feeding chamber from the dispensing chamber in the closed position and allows a compressed sweeping air to travel through the dispensing chamber into the injection sleeve to clear accumulated dry graphite lube in the injection sleeve, further wherein the cap means closes off the sweeper chamber in the open position to allow a compressed dispensing air to deliver the predetermined amount of dry graphite lube to the injection sleeve.

4. The dry graphite lube applicator according to claim 3, wherein the compressed sweeping air and the compressed dispensing air is delivered from the air compressor source.

5. The dry graphite lube applicator according to claim 3, wherein the sweeper means is placed in the closed position by compressed sweeping air and returned to the open position by a spring mechanism.

6. A dry graphite lube applicator for a die cast machine having an injection sleeve, the dry graphite lube applicator comprising:
   a hopper holding dry graphite lube;
   a feeding chamber in gravity communication with the hopper;
   a feeding turn screw disposed within the feeding chamber having a plurality of spiraling turns disposed around the circumference of the turn screw, wherein the plurality of spiraling turns of the feeding turn screw is in a tight rotatable relationship with the feeding chamber;
   a controlling device coupled to the turn screw to control extent of the turning thereof to accurately estimate an amount of dry graphite lube to be deposited based on the number of turns of the turn screw and the speed of the turns;
   a dispensing chamber in communication with the feeding chamber, wherein the feeding screw deposits the accurately estimated amount of dry graphite lube; and
   an air compressor source in pressure communication with the dispensing chamber to deliver the accurately estimated amount of dry graphite lube to the injection sleeve of the die cast machine.

7. The dry graphite lube applicator according to claim 6, further comprising a sweeper mechanism which comprises:
   a sweeper chamber in communication with the dispensing chamber;
   a plunger slidably engaged within the sweeper chamber having an open and closed position; and
   a cap means attached to one end of the plunger, wherein the cap means closes off the feeding chamber from the dispensing chamber in the closed position and allows compressed air to travel through the dispensing chamber into the injection sleeve to clear stray dry graphite lube, further wherein the cap means closes off the sweeper chamber in the open position to allow compressed air to deliver the dry graphite lube to the injection sleeve.

8. A dry graphite lube applicator for a die cast machine having an injection sleeve, the dry graphite lube applicator comprising:
   a hopper holding dry graphite lube;
   a feeding chamber in gravity communication with the hopper;
   a feeding turn screw disposed within the feeding chamber having a plurality of spiraling turns disposed around the circumference of the turn screw, wherein the plurality of spiraling turns of the feeding turn screw is in a tight rotatable relationship with the feeding chamber;
   a controlling device coupled to the turn screw to control extent of the turning thereof to accurately estimate an amount of dry graphite lube to be deposited based on the number of turns of the turn screw and the speed of the turns;
   a dispensing chamber in communication with the feeding chamber, wherein the feeding screw deposits the accurately estimated amount of dry graphite lube; and
   an air compressor source in pressure communication with the dispensing chamber to deliver the accurately estimated amount of dry graphite lube to the injection sleeve of the die cast machine; and a sweeper mechanism utilizing the air compressor source to clear stray dry graphite lube from inside the dry graphite lube applicator and the injection sleeve of the die cast machine.

9. The dry graphite lube applicator according to claim 1, wherein the driving device is a motor.

10. The dry graphite lube applicator according to claim 1, wherein the controlling device includes a control circuit and a timer.

11. The dry graphite lube applicator according to claim 2, wherein the tight rotatable relationship acts as a buffer for air to travel to the hopper, minimizing direct air contact with the dry graphite lube in the hopper.

12. The dry graphite lube applicator according to claim 6, wherein the controlling device includes a control circuit and a timer.

13. The dry graphite lube applicator according to claim 8, wherein the controlling device includes a control circuit and a timer.

14. A dry graphite lube applicator for a die cast machine having an injection sleeve, the dry graphite lube applicator comprising:

a hopper holding dry graphite lube;

a feeding chamber in gravity communication with the hopper;

a feeding turn screw disposed within the feeding chamber having a plurality of spiraling turns disposed around the circumference of the turn screw, wherein each turn holds a predetermined amount of dry graphite lube;

a driving device connected to the feeding turn screw to rotate the feeding turn screw within the feeding chamber;

a dispensing chamber in communication with the feeding chamber, wherein the feeding screw deposits the predetermined amount of dry graphite lube;

an air compressor source in pressure communication with the dispensing chamber to deliver the predetermined amount of dry graphite lube to the injection sleeve of the die cast machine; and a sweeper mechanism that includes a sweeper chamber in communication with the dispensing chamber, a plunger slidably engaged within the sweeper chamber having an open and closed position, and a cap means attached to one end of the plunger, wherein the cap means closes off the feeding chamber from the dispensing chamber in the closed position and allows a compressed sweeping air to travel through the dispensing chamber into the injection sleeve to clear accumulated dry graphite lube in the injection sleeve, further wherein the cap means closes off the sweeper chamber in the open position to allow a compressed dispensing air to deliver the predetermined amount of dry graphite lube to the injection sleeve.

15. The dry graphite lube applicator according to claim 14, wherein the compressed sweeping air and the compressed dispensing air is delivered from the air compressor source.

16. The dry graphite lube applicator according to claim 14, wherein the sweeper means is placed in the closed position by compressed sweeping air and returned to the open position by a spring mechanism.

17. A dry graphite lube applicator for a die cast machine having an injection sleeve, the dry graphite lube applicator comprising:

a hopper holding dry graphite lube;

a feeding chamber in gravity communication with the hopper;

a feeding turn screw disposed within the feeding chamber having a plurality of spiraling turns disposed around the circumference of the turn screw, wherein the plurality of spiraling turns of the feeding turn screw is in a tight rotatable relationship with the feeding chamber;

a dispensing chamber in communication with the feeding chamber, wherein the feeding screw deposits the dry graphite lube; and an air compressor source in pressure communication with the dispensing chamber to deliver the dry graphite lube to the injection sleeve of the die cast machine; and a sweeper mechanism that includes a sweeper chamber in communication with the dispensing chamber, a plunger slidably engaged within the sweeper chamber having an open and closed position, and a cap means attached to one end of the plunger, wherein the cap means closes off the feeding chamber from the dispensing chamber in the closed position and allows compressed air to travel through the dispensing chamber into the injection sleeve to clear stray dry graphite lube, further wherein the cap means closes off the sweeper chamber in the open position to allow compressed air to deliver the dry graphite lube to the injection sleeve.

\* \* \* \* \*